United States Patent [19]

Lafuente Ruberte

[11] 4,128,147

[45] Dec. 5, 1978

[54] VEHICLE SPEED REDUCER OR EDDY CURRENT BRAKE

[76] Inventor: Antonio Lafuente Ruberte, Argualas St. s/n°, Zaragoza, Spain

[21] Appl. No.: 813,292

[22] Filed: Jul. 6, 1977

[30] Foreign Application Priority Data

Nov. 30, 1976 [ES] Spain ................... 453.792

[51] Int. Cl.² ............................ F16D 65/34
[52] U.S. Cl. ...................... 188/164; 188/196 M; 310/93
[58] Field of Search .............. 188/2R, 164; 310/93, 310/105

[56] References Cited

U.S. PATENT DOCUMENTS

| | | | |
|---|---|---|---|
| 2,076,047 | 4/1937 | Scott | 188/196 M |
| 3,413,500 | 11/1968 | Gomez | 188/164 UX |
| 3,496,396 | 2/1970 | Jollois | 310/93 |
| 3,522,461 | 8/1970 | Geul | 310/93 |
| 3,908,141 | 9/1975 | Lemonnier | 310/93 |

Primary Examiner—Duane A. Reger
Attorney, Agent, or Firm—Ostrolenk, Faber, Gerb & Soffen

[57] ABSTRACT

A speed reducer or eddy current brake for a vehicle, wherein the frame of the speed reducer is affixed on the support housing of the vehicle differential; the speed reducer includes a stator attached to the frame of the reducer; the frame is adjustable in position with respect to the stator; the rotor of the speed reducer is a flywheel which is properly positioned with respect to the vehicle drive shaft; means for adjusting the flywheel position with respect to the stator; means for magnetically shielding the bearings of the drive shaft of the flywheel from the magnetic force lines from the stator.

4 Claims, 2 Drawing Figures

VEHICLE SPEED REDUCER OR EDDY CURRENT BRAKE

FIELD OF THE INVENTION

The present invention relates to electromagnetic force speed reducers or eddy current brakes, particularly for heavy vehicles.

BACKGROUND OF THE INVENTION

Particularly with respect to load carrying vehicles, such as trucks, common carriers and buses, their great weight and hence great inertia give rise to problems in their operation. The vehicles are both braked, which leads to their immobilization, and they are slowed or decelerated, which consists in diminishing their velocity.

For braking purposes, vehicles are equipped with drum or disc brakes. Brake operation is based on friction produced by rubbing of a brake shoe or block against a drum or disc. The material of the drum or disc is a casting of iron having specific characteristics. The lining of the brake shoe is an agglomerate made from an asbestos base and special formulations depending on the case. The absorbed energy caused by braking is transformed into heat. This raises the temperature of the brake shoe lining and of the brake drum or disc. The heat is subsequently dissipated by a current of air. The permissible temperature rise of the lining and drum or disc has an upper limit, because it can lead to changes in their structures, and can even damage these elements. Furthermore, the coefficient of friction of the brake drops substantially, reducing the braking capacity when a temperature of approximately 350°–400° C. is exceeded. With infrequent use of the brake, there will be time between brakings for dissipation of heat, and the temperature of the brake components will not harmfully rise. But, if the brake is used very frequently, or is operated for long periods, there is a risk of incapacitating the brake with the resultant possibility of an accident.

These drawbacks of brakes have led to the creation of speed reducers which diminish, or at least do not increase, the speed of the vehicle, although they do not serve to immobilize the vehicle, as this is still the function of conventional brakes. These speed reducers are not damaged even when used frequently or over prolonged periods. The most common application of speed reducers involves their insertion in the transmissions of heavy vehicles. The most common type of speed reducer is an eddy current brake and operates electromagnetically, in which braking action originates in the Foucault currents stemming from the resistance as a magnetizable material drive or flywheel moves within the magnetic field created as a direct current passes through the magnet coils of the stator of the device. The braking force is proportional to the space or air-gap existing between the rotor or flywheel and the poles of the stator coil. This space is typically on the order of 1 to 1.5 mm. Moreover, the flywheels have an outside diameter in the range of 300 mm. to 500 mm., and are subjected to velocities which in modern transmissions exceed 2,000 rpm. All of this, combined with the high braking forces produced, leads to the use of speed reducers of a weight of around 200 kg. This requires rigidity in the placement of the stator relative to the movement of the flywheels, and requires great precision in the positioning or gauging of the stator relative to the flywheels.

At the present time, speed reducers are often placed between the gearbox and the rear axle, generally the driving axle. This makes it necessary to attach the speed reducer to the fixed chassis, while the rear shaft floats with respect to the chassis. Therefore, the speed reducer will tend to float with respect to the rear shaft, which implies lack of rigidity of installation. In the case of short transmissions, there is practically no space in which to place the speed reducer.

Alternatively, the speed reducer is suspended from the chassis. The chassis must have in its interior the central body which accommodates the shaft and the bearing supporting the movement of the flywheels, wherein the bearing shaft assembly is included between the flywheels. Such placement leads to problems of cooling, limited space for lubricant, difficulties in applying lubrication due to problems of access, and difficulties of insulating the elements magnetically against the influence of the magnetic field on the bearings, which reduces their useful lives.

SUMMARY OF THE INVENTION

The principal object of the present invention is to enhance the working conditions of the speed reducers and provide greater facility in the installation thereof in heavy vehicles, such as trucks and buses.

Another object of the invention is to overcome the above stated drawbacks of the prior art.

The present invention provides a speed reducer capable of being mounted on the differential housing of the vehicle, which housing supports the entire differential unit, thereby obtaining a rigid mounting of the speed reducer. The stator is connected stationary but adjustable in position with respect to the frame of the speed reducer. The vehicle drive or pinion shaft extends through support bearings and supports the flywheel of the speed reducer. Typically, there are two flywheels. The flywheels can be adjusted axially to reposition them with respect to each other.

For a better understanding of the invention, an embodiment thereof is described with reference to the accompanying drawings.

DESCRIPTION OF A PREFERRED EMBODIMENT

Figure 1:
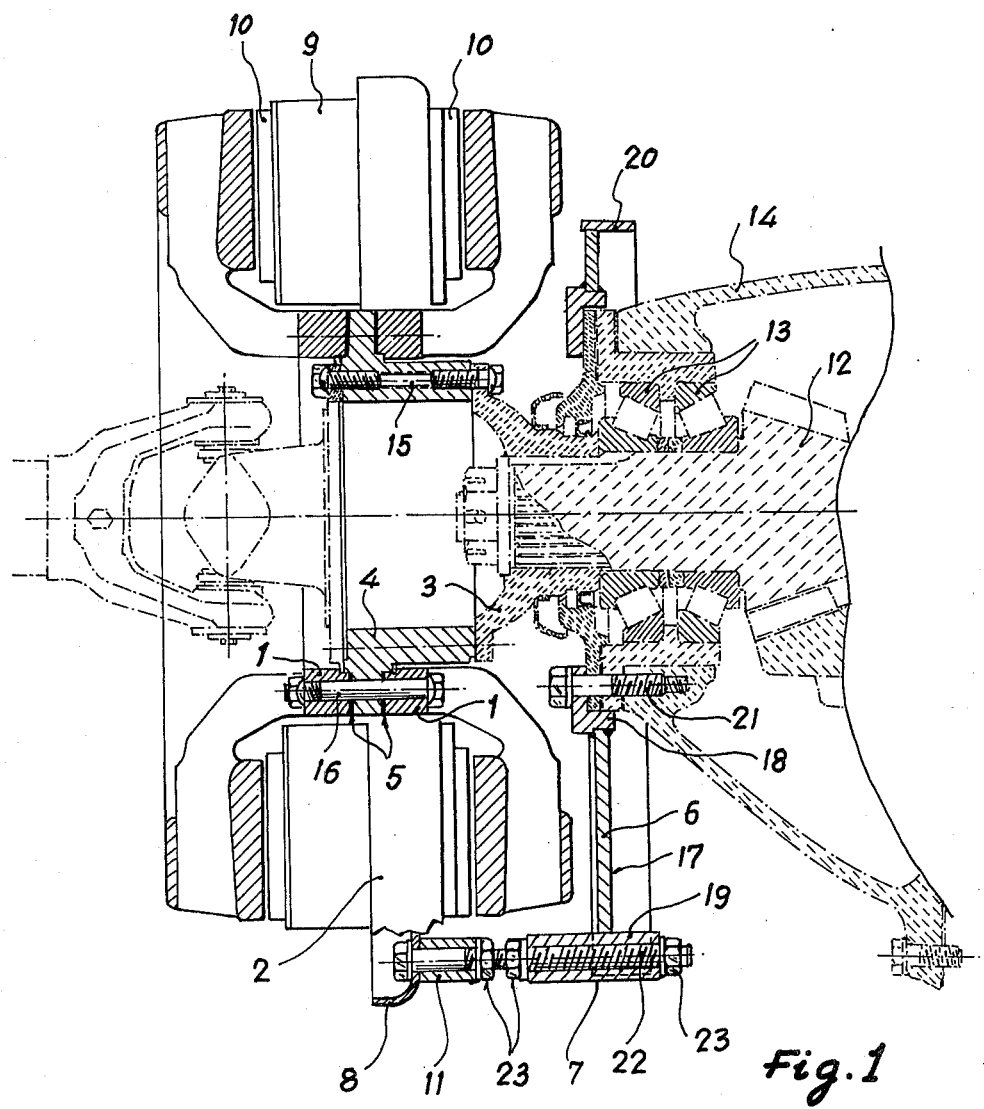
FIG. 1 represents a longitudinal cross-sectional view through a speed reducer and its support according to the invention, along the line I—I of FIG. 2.
Figure 2:
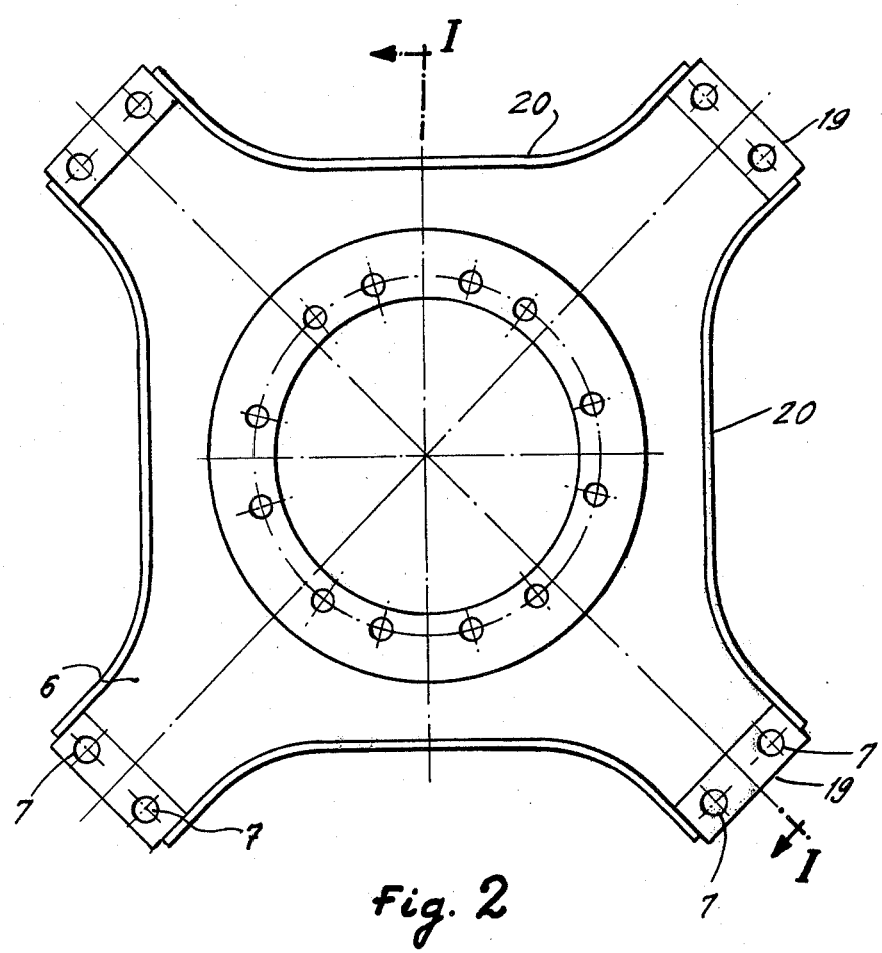
FIG. 2 shows a front view of a vehicle chassis supporting the speed reducer.

The differential housing 14 supports the entire differential assembly of a vehicle (not shown). The supporting frame 6 of the speed reducer is fixed to the housing 14. The frame 6 is highly rigid and it is comprised of a ribbed ring 18 which is joined, by means of screws 21, twelve in number in this case, to the differential housing 14. A central body 17 is firmly welded to the ring 18. Body 17 is generally cruciform in shape. It is equipped with an exterior rib 20 extending around most of its exterior. The pointed parts of the body 17, are capped by the caps 19. Caps 19 receive and support the speed reducer stator 2. Screws 22 are threaded in bushings 7 of supporting frame 6 and once screws 22 are fixed in place with nuts 23, it is impossible for screws 22 to move or come loose. The screws 22 are likewise received in the bushings 11 of stator 2. Screws 22 make it possible to adjust, with micrometric precision, the separation of stator 2 from the supporting frame 6. Moreover, owing to the circular position of bushings 7 at all points around frame 6 and owing to the large diameter of this circle of orifices, as compared with the smaller outside diameter of the below described flywheels 1, there is a strong attachment of stator 2 to frame 6 and there is great circular precision for the separation or air-gap between the flywheels 1 and the stator 2.

The rotor is comprised of flywheel means, including annular flywheels 1 which rotate around the same axis of the stator. Two flywheels 1 are shown, both coaxial and spaced axially apart. To attach the flywheels 1, there is a disc 3 which is rigidly joined, by means of grooving and nut with cotter-pin, to the drive pinion shaft 12. Shaft 12 rotates between conical bearings 13. The shaft 12 has a conically narrowed intermediate section. The bearings 13 are suitably positioned internally with blade separators to adjust the play between the bearings independently of the tightening torque applied on the nut that is holding the disc 3. This is inherent in the operability of the drive pinion in the differential unit. This produces high rigidity in the rotation of the drive pinion shaft 12 between conical bearings 13.

The vehicle transmission transmits the movement of the gearbox to the differential unit in the drive shaft of the vehicle. The transmission is joined to the disc 3 before the positioning of the speed reducer. There is an intermediate disc 4 which is joined to disc 3 by an annular array of male-female fittings and by screws in bores 15 in disc 4. Disc 4 is also joined to the flywheels 1, likewise by an annular array of male-female fittings and by screws in the bores 16 in flywheels 1. A radially outwardly extending section of disc 4 extends between the flywheels 1. The tolerances of the fittings are very close to insure that the rotation shaft of flywheels 1 coincides with the drive pinion shaft 12.

At the connections of the flywheels 1 to disc 4, annular leaves 5 of various thicknesses are interposed, in order to be able to vary the separation between the flywheels with high precision.

Stator 2 is comprised of magnetic shield frame 8 which supports coils 9. The cores of the coils terminate in yokes 10 which are the exit and entrance for the lines of force of the magnetic field which pass between two consecutive stator coils by a pathway through the flywheels, generating the braking force by such passage of the lines of force.

In view of the position of the speed reducer relative to the primary drive pinion crown assembly of the differential unit, and referring to the conical bearings 13 which support the drive pinion shaft 12 and which position the shaft 12 to regulate the attack or play of the pinion with the crown wheel and in view of the great force of the magnetic field created by coils 9, and the proximity thereto of the conical bearings 13, this requires the shield 8 be of stainless steel or magnetic material to insure that the lines of force issue almost exclusively through the yokes 10 of the cores of the coils 9 and, as the magnetic field closes through flywheel 1, that the lines of force return to the yoke 10 of the next coil.

In the free part of intermediate disc 4, and by means of the same screws which joined discs 3 and 4, another disc external of the transmission may also be joined.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. An electromagnetic force speed reducer for a vehicle, comprising:
   a vehicle differential unit; said differential unit including a differential housing;
   a supporting frame which is rigidly affixed to said differential housing; said supporting frame including internal bearings located internally thereof; said supporting frame including an enlarged, generally ring-like, structure having a periphery at which are located a plurality of caps;
   a rotor comprised of flywheel means attached to said drive shaft and rotatable therewith; a flywheel disc attached to said flywheel means;
   a drive shaft disc coupled to said drive shaft to rotate therewith and said drive shaft disc extending generally toward said flywheel means;
   said flywheel means disc and said drive shaft disc being coupled for causing said drive shaft to rotate said flywheel means; the coupling of said drive shaft disc and said flywheel means disc being by means of an annular array of male and female fittings around said flywheel means axis;
   said flywheel means comprise a plurality of annular flywheels arranged coaxially and spaced apart axially; said flywheel means disc projecting between two said flywheels and those two said flywheels being normally urged toward said flywheel means disc between them;
   at least one annular spacing leaf interposed between the portion of said flywheel means disc projecting between said flywheels and the adjacent said flywheel, for adjusting the separation of said flywheels;
   a stator comprised of a plurality of coils positioned at the vicinity of said flywheel means, such that electromagnetic lines of force will travel between said stator and said rotor;
   a plurality of screws extending from said stator to said caps fixedly attaching said stator to said supporting frame; bushings in said caps into which said screws are threadedly received; said plurality of screws being adapted for micrometrically adjusting the position of said stator with respect to the position of said supporting frame.

2. The electromagnetic force speed reducer of claim 1, wherein said bearings for said drive shaft are oriented to define a conically tapering narrower passageway through which said drive shaft passes and said drive shaft being correspondingly narrowed along its length for cooperating with and being supported by said drive shaft bearings.

3. The electromagnetic force speed reducer of claim 1, wherein said ringlike structure is generally cruciform in shape, with said caps being at the ends of the legs of said cruciform ring-like structure.

4. The electromagnetic force speed reducer of claim 1, wherein said stator comprises an annular array of magnetic coils, including cores in which said coils terminate and through which said cores the lines of force of magnetic field pass and said cores also being positioned so that the lines of force of magnetic field may reach to said flywheel means; said cores extending toward said drive shaft bearings;

a shield frame of non-magnetic material supporting said magnetic coils at the aforesaid orientations; said shield frame extending between said magnetic coils and said drive shaft bearings for shielding those said bearings from the lines of force of the magnetic field; said shield frame not extending to magnetically shield the lines of force of the magnetic field from extending between said stator core coils and said flywheel means.

* * * * *